Patented Feb. 27, 1934

1,949,366

UNITED STATES PATENT OFFICE 1,949,366

PREPARATION OF DIALKYL SULPHATES

Thomas F. Carruthers, South Charleston, W. Va., assignor to Carbide and Carbon Chemicals Corporation, a corporation of New York No Drawing. Application June 25, 1932
Serial No. 619,276

9 Claims. (Cl. 260—98)

My invention relates to the preparation of dialkyl sulphates, referring more specifically to a process for effecting their preparation from gaseous olefines, that is, olefines which exist as gases at or near normal conditions of temperature and pressure.

Acid liquor containing dialkyl sulphates dissolved in concentrated sulphuric acid may, by known methods, be obtained by absorbing gaseous olefines in sulphuric acid under appropriate conditions. If the acid liquor is clean, as for instance in laboratory practice, it is a relatively simple matter to separate the dialkyl sulphate by diluting the liquor with water, for dialkyl sulphates are insoluble in dilute acid and separate therefrom as an immiscible layer. However, in commercial applications of the process it is not economically feasible always to use pure, clean acid for forming the acid liquor since the dilute acid recovered after removal of sulphates must, as a practical matter, be reconcentrated and put back into the process, which reconcentrated acid picks up a content of carbonaceous impurities, amounting often to as much as 0.1% or more by weight. Acid which is reconcentrated by heat is particularly susceptible to contamination by carbonaceous impurities. When acid liquor which has been formed by absorbing olefine gases in this dirty acid is diluted with water, the dialkyl sulphate is precipitated, but does not form a layer separated from the dilute acid; the presence of the carbonaceous material causes the precipitated sulphates to form with the dilute liquor what appears to be a stable emulsion. The known method of separating dialkyl sulphate from absorber liquor by dilution with water is therefore difficult of commercial application, since it requires the use of clean acid in the absorbers.

Also, it has been proposed to separate dialkyl sulphate from acid liquor by extraction with a solvent for dialkyl sulphate which is immiscible with the rest of the liquor. Benzene, ligroin, and ether have been suggested as solvents for this purpose. Solvent extraction cannot feasibly be effected by the use of these materials, however, since benzene and ligroin have only a very feeble solvent power for dialkyl sulphates, and ether is miscible in all proportions with both the sulphates and the concentrated acid liquor.

I have discovered that if to each volume of concentrated acid liquor containing dialkyl sulphate there is added at least one and one-half or two volumes of a solvent material in which dialkyl sulphate is readily soluble but which is immiscible with water, and sufficient water to dilute the acid to a strength insufficient to dissolve dialkyl sulphate, a layer containing the added solvent material and the dialkyl sulphate will readily separate from the diluted liquor, regardless of carbonaceous impurities which may be contained in the concentrated liquor.

According to my invention any solvent material which is substantially immiscible with water and which is a good solvent for the dialkyl sulphate may be used, but there are certain advantages to be obtained by the use of ethyl ether or isopropyl ether. These two solvents have a very low boiling point and high volatility, which adapt them well to removal and recovery by distillation from the separated dialkyl sulphate solution. The solvent material may of course comprise more than one compound; for instance, a mixture of ethyl and isopropyl ethers may be used.

Generally, from one to two volumes of water for each volume of concentrated acid liquor is sufficient to bring about a satisfactory separation of dialkyl sulphate from the dilute liquor. The water may be added before, during, or after the addition of solvent material, but there are important advantages to be gained by adding the water after the addition of solvent, for if this order is not followed very thorough agitation is required in order to recover all of the dialkyl sulphate.

Experiments which I have conducted demonstrate the practicability and advantages of my process. The following data resulted from several typical experiments. In these examples, the procedure followed was to absorb ethylene in concentrated sulphuric acid, to add ethyl ether to the absorber product of acid liquor, to add water to the mixture of ether and absorber product, and to separate the two layers so formed. The ether was then stripped from the upper layer and the crude diethyl sulphate was distilled out under reduced pressure. The ether was then distilled out of the lower layer and its quantity determined. The following table gives the numerical data obtained, the figures representing parts by weight and volume as indicated. The absorber product used in all experiments was of substantially the same strength and contained substantially the same concentration of diethyl sulphate.

| Experiment No. | 1 | | 2 | | 3 | |
|---|---|---|---|---|---|---|
| *Materials used* | Wt. | Vol. | Wt. | Vol. | Wt. | Vol. |
| Absorber product | 327 | 250 | 328 | 250 | 258 | 200 |
| Ethyl ether | 268 | 375 | 363 | 500 | 281 | 400 |
| Water | 250 | 250 | 247 | 247 | 395 | 395 |
| *Materials recovered* | | | | | | |
| UPPER LAYER | | | | | | |
| Ether | 164 | 231 | 255 | 350 | 213 | 306 |
| Diethyl sulphate | 91.7 | 77.4 | 97.8 | 82.7 | 80.6 | 68.1 |
| LOWER LAYER | | | | | | |
| Ether | 104 | 144 | 108 | 150 | 68 | 94 |
| Residual | 483 | 386 | 473 | 390 | 574 | 506 |
| Vol. ratio absorber product to ether to water | | 1:1.5:1 | | 1:2:1 | | 1:2:2 |
| Percent weight absorber product recovered as diethyl sulphates | | 28.0% | | 29.8% | | 31.2% |

While the above specific examples are limited to diethyl sulphate, it will readily be understood that my process is applicable to the preparation of dialkyl sulphates generally. The higher dialkyl sulphates, for example the dialkyl sulphates formed by absorbing propylene or butylene in sulphuric acid, are of somewhat less importance at the present time than diethyl sulphate, since the former are unstable and tend to decompose upon standing.

I claim:

1. Process of preparing dialkyl sulphates from gaseous olefines which comprises the steps of absorbing the olefine in concentrated sulphuric acid which contains appreciable amounts of carbonaceous impurities, adding to the acid liquor so formed water and at least one liquid solvent for dialkyl sulphate which is substantially immiscible with water, and recovering the dialkyl sulphate thereby separated.

2. Process of preparing dialkyl sulphates from gaseous olefines which comprises the steps of absorbing the olefine in concentrated sulphuric acid which contains appreciable amounts of carbonaceous impurities, adding to each volume of the acid liquor so formed water and at least about 1½ volumes of at least one liquid solvent for dialkyl sulphate which is substantially immiscible with water, and recovering the dialkyl sulphate thereby separated.

3. Process of preparing dialkyl sulphates from gaseous olefines which comprises the steps of absorbing the olefine in concentrated sulphuric acid which contains appreciable amounts of carbonaceous impurities, adding to each volume of the acid liquor so formed water and at least about 2 volumes of at least one liquid solvent for dialkyl sulphate which is substantially immiscible with water, and recovering the dialkyl sulphate thereby separated.

4. Process of preparing dialkyl sulphates from gaseous olefines which comprises the steps of absorbing the olefine in concentrated sulphuric acid which contains appreciable amounts of carbonaceous impurities, adding to each volume of the acid liquor so formed at least about 1½ volumes of at least one liquid solvent for dialkyl sulphate which is substantially immiscible with water, adding water, and recovering the dialkyl sulphate, thereby separated, by decantation and by removal of the solvent through distillation.

5. Process of preparing dialkyl sulphates from gaseous olefines which comprises the steps of absorbing the olefine in concentrated sulphuric acid which contains appreciable amounts of carbonaceous impurities, adding to each volume of the acid liquor so formed at least about 1½ volumes of at least one liquid solvent for dialkyl sulphate which is substantially immiscible with water, adding at least about 2 volumes of water, and recovering the dialkyl sulphate thereby separated.

6. Process of preparing dialkyl sulphates from gaseous olefines which comprises the steps of absorbing the olefine in concentrated sulphuric acid which contains appreciable amounts of carbonaceous impurities, adding to each volume of the acid liquor so formed at least about 1½ volumes of at least one liquid solvent for dialkyl sulphate of the group consisting of ethyl ether and isopropyl ether, adding at least about 2 volumes of water, and recovering the dialkyl sulphate thereby separated.

7. Process of preparing dialkyl sulphates from gaseous olefines which comprises the steps of absorbing the olefine in concentrated sulphuric acid which contains appreciable amounts of carbonaceous impurities, adding to the acid liquor so formed at least about 1½ volumes of ethyl ether and at least about one volume of water for each volume of the acid liquor, the additions being made in the order above mentioned, and settling and recovering the dialkyl sulphate thereby separated.

8. Process of preparing dialkyl sulphates from gaseous olefines which comprises the steps of absorbing the olefine in concentrated sulphuric acid which contains appreciable amounts of carbonaceous impurities, adding to the acid liquor so formed at least about 1½ volumes of isopropyl ether and at least about one volume of water for each volume of the acid liquor, the additions being made in the order above mentioned, and settling and recovering the dialkyl sulphate thereby separated.

9. Process of preparing diethyl sulphate from ethylene which comprises the steps of absorbing the ethylene in concentrated sulphuric acid which contains appreciable amounts of carbonaceous impurities, adding to the acid liquor so formed at least about 1½ volumes of ethyl ether and at least about two volumes of water for each volume of the acid liquor, the additions being made in the order above mentioned, and settling and recovering the dialkyl sulphate thereby separated.

THOMAS F. CARRUTHERS.